United States Patent
Suzuki et al.

(10) Patent No.: US 9,356,437 B2
(45) Date of Patent: May 31, 2016

(54) TEMPORARY FIXATION BOSS AND ELECTRICAL JUNCTION BOX

(71) Applicant: Yazaki Corporation, Minato-ku, Tokyo (JP)

(72) Inventors: Masanobu Suzuki, Toyota (JP); Hiroki Shiraiwa, Makinohara (JP); Shigeharu Tsukui, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 3 days.

(21) Appl. No.: 14/186,332

(22) Filed: Feb. 21, 2014

(65) Prior Publication Data

US 2014/0166330 A1    Jun. 19, 2014

Related U.S. Application Data

(63) Continuation-in-part of application No. PCT/JP2012/071329, filed on Aug. 23, 2012.

(30) Foreign Application Priority Data

Aug. 24, 2011    (JP) .................................. 2011-182187

(51) Int. Cl.
*F16B 19/00* (2006.01)
*H02G 3/08* (2006.01)
*B60R 16/023* (2006.01)
*F16B 13/04* (2006.01)

(52) U.S. Cl.
CPC .............. *H02G 3/08* (2013.01); *B60R 16/0238* (2013.01); *F16B 13/045* (2013.01)

(58) Field of Classification Search
CPC ...... F16B 13/045; H02G 2/08; B60R 16/0238

USPC .................................... 411/508–510; 24/297
See application file for complete search history.

(56) References Cited

U.S. PATENT DOCUMENTS

| 4,940,355 | A | * | 7/1990 | Buchanan | ............... A47B 47/05 24/663 |
| 4,952,106 | A | * | 8/1990 | Kubogochi | ......... F16B 19/1081 411/48 |
| 5,797,714 | A | * | 8/1998 | Oddenino | ........... B60R 13/0206 411/508 |
| 6,077,116 | A | | 6/2000 | Yamamoto et al. | |

FOREIGN PATENT DOCUMENTS

| JP | 09-190860 A | 7/1997 |
| JP | 11-113140 A | 4/1999 |
| JP | 2010-166780 A | 7/2010 |

* cited by examiner

*Primary Examiner* — Gary Estremsky
(74) *Attorney, Agent, or Firm* — Sughrue Mion, PLLC

(57) ABSTRACT

A temporary fixation boss includes: a shaft portion; a flared portion; and claw portions. The shaft portion has a diameter smaller than a diameter of an insertion hole. The flared portion is provided at one end of the shaft portion in a manner to be flared in multi steps from an outer periphery of the shaft portion throughout the whole circumference of the shaft portion. The claw portions are so formed that a distance from the shaft center of the shaft portion to a tip end of the claw portions in a radial direction of the shaft portion is larger than a distance from the shaft center to a tip end of the flared portion, and smaller than a distance from the shaft center to the inner edges of the insertion hole when the shaft center is aligned with the center axis of the insertion hole.

8 Claims, 4 Drawing Sheets

TEMPORARY FIXATION BOSS AND ELECTRICAL JUNCTION BOX

TECHNICAL FIELD

The present invention relates to a mounting technique of various devices on such as a vehicle, and in particular, to a mounting technique of an electrical junction box receiving electric components such as a relay and a fuse.

BACKGROUND ART

A concrete detailed explanation with figures is omitted, but for example, in a vehicle production line of an automaker, when an electrical junction box is mounted on a vehicle body, normally, the electrical junction box is fixed to the vehicle body with a screw from a bottom side. In this case, due to a weight of the electrical junction box itself, an upper side is separated from a mounting position of a vehicle body side. Further, for example, as disclosed in PTL 1 below, when the electrical junction box cannot be mounted on the vehicle directly due to a structural reason or the like, the electrical junction box is mounted on the vehicle body indirectly via a metallic plate bracket or the like. However, even in this case also, because the electrical junction box is mounted on the metallic plate bracket from the bottom side, an upper side of the metallic plate bracket is uplifted from the electrical junction box. Resultingly, it is necessary for a worker to support the electrical junction box with his hand while mounting the electrical junction box, and workability thereof is reduced.

For solving this problem, conventionally, as disclosed in PTL 2 and PTL 3 below, techniques for preventing the electrical junction box from being separated and for preventing the metallic plate bracket from being uplifted have been proposed. According to these techniques, a locking projection or a boss is provided for temporarily fixing the electrical junction box to the bracket or the vehicle body, and a claw or a ring is formed for preventing them from being released. Owing to such a structure, the metallic plate bracket is hard to be uplifted.

However, when the claw or the ring is formed, a size thereof may be varied. Thereby, when an overlap range between the claw or the ring and an edge of an insertion hole becomes large, an insertion resistance becomes large. Then, a large insertion force is necessary and it becomes hard to insert them. In some cases, the claw or the ring is damaged and cannot be re-used. In contrast, when the claw or the ring is too small, it is easy to be inserted, but has insufficient holding force. Therefore, in some products, the metallic plate bracket may be uplifted.

CITATION LIST

Patent Literature

[PTL 1]
JP, A, 2007-186083
[PTL 2]
JP, A, H08-256419
[PTL 3]
JP, A, 2010-166780

SUMMARY OF INVENTION

Technical Problem

As described the above, according to the conventional techniques, depending on variations of a size or a shape of a member for temporarily fixing the electrical junction box, the insertion resistance may become large, or the holding force may become small. When the insertion resistance is larger, a larger insertion force is necessary, and thereby a mounting operation becomes difficult. Further, when the holding force is smaller, the metallic plate bracket becomes easy to be released, and similarly the mounting operation becomes difficult. In this way, according to the conventional techniques, mounting workability of the electrical junction box is reduced.

An object of the present invention is to solve the above problems. Namely, an object of the present invention is to provide a temporary fixation boss and an electrical junction box able to improve workability.

Solution to Problem

For achieving the above object, according to a first aspect of the present invention, there is provided a temporary fixation boss including:

a shaft portion having a diameter smaller than a diameter of an insertion hole;

a flared portion flared singularly or collectively throughout a whole circumference on an outer periphery of the shaft portion and disposed at one end of the shaft portion, said flared portion having a diameter smaller than the diameter of the insertion hole; and a claw portion projected from an outer periphery of the flared portion, and a distance from a shaft center of the shaft portion to a tip of the claw portion in a radial direction of the shaft portion being longer than a distance from the shaft center to a tip of the flared portion and shorter than a distance from the shaft center to an inner edge of the insertion hole when the shaft center is aligned with the center of the insertion hole.

According to the temporary fixation boss as described in the first aspect, the diameters of the shaft portion, the flared portion, and the projection length of the claw portion are smaller than the diameter of the insertion hole. Thereby, because a resistance upon inserting the boss into the insertion hole is hard to be generated, the boss can be easily inserted into the insertion hole. On the other hand, there is provided the flared portion flared singularly or collectively throughout a whole circumference on an outer periphery of the shaft portion and disposed at one end of the shaft portion, and the claw portion projected from an outer periphery of the flared portion. Thereby, after once the boss is inserted into the insertion hole, an inner edge of the insertion hole is easily hooked on the boss, and the boss is hard to be released from the insertion hole.

According to a second aspect of the present invention, there is provided the temporary fixation boss as described in the first aspect, wherein at least one claw portion is respectively provided on both outer sides in the radial direction of the shaft portion as the shaft center being the center of symmetry.

According to the temporary fixation boss as described in the second aspect, because at least two claw portions are shifted 180 degrees from each other in a circumferential direction of the shaft portion, the inner edge of the insertion hole is further easily hooked on the boss, and the boss is further hard to be released from the insertion hole.

According to a third aspect of the present invention, there is provided the temporary fixation boss as described in the first or second aspect, wherein at least two of the claw portions are shifted from each other along a shaft direction of the shaft portion.

According to the temporary fixation boss as described in the third aspect, because at least two of the claw portions are shifted from each other along a shaft direction of the shaft portion which is substantially the same as an insertion direction of the boss, the inner edge of the insertion hole is further easily hooked on the boss, and the boss is further hard to be released from the insertion hole.

According to a fourth aspect of the present invention, there is provided the temporary fixation boss as described in any one of the first to third aspects, wherein a projection length of the claw portion from the shaft center becomes larger as extending toward the other end from the one end of the shaft portion.

According to the temporary fixation boss as described in the fourth aspect, when the boss is inserted into the insertion hole, because the claw portion is hard to be hooked on the inner edge of the insertion hole, the boss can be further easily inserted into the insertion hole. Further, after inserted, because the claw portion is further easily hooked on the inner edge of the insertion hole, and the boss is further hard to be released from the insertion hole.

According to a fifth aspect of the present invention, there is provided the temporary fixation boss as described in any one of the first to fourth aspects, wherein the diameter of the flared portion becomes larger as extended toward the other end from the one end of the shaft portion.

According to the temporary fixation boss as described in the fifth aspect, when the boss is inserted into the insertion hole, because the flared portion is hard to be hooked on the inner edge of the insertion hole, the boss can be further easily inserted into the insertion hole. Further, after inserted, because the flared portion is further easily hooked on the inner edge of the insertion hole, and the boss is further hard to be released from the insertion hole.

According to a sixth aspect of the present invention, there is provided an electrical junction box including:

a first mounted portion through which an electrical junction box main body is mounted on a first mounting portion of a mounting side;

a second mounted portion configured to be mounted on a second mounting portion of the mounting side, and to be rotated about the first mounted portion mounted on the first mounting portion until mounted on the second mounting portion, wherein the temporary fixation boss as described in any one of first to fifth aspects is arranged adjacent to the second mounted portion, and wherein the boss is inserted into the insertion hole arranged adjacent to the second mounting portion of the mounting side from the one end of the shaft portion to prevent the second mounted portion from rotating.

According to the electrical junction box as described in the sixth aspect, the temporary fixation boss is arranged adjacent to the second mounted portion configured to be rotated about the first mounted portion mounted on the first mounting portion until mounted on the second mounting portion. Then, when the temporary fixation boss is inserted into the insertion hole arranged adjacent to the second mounting portion of the mounting side from the one end of the shaft portion, the second mounted portion is prevented from being rotated. Here, the temporary fixation boss is configured to be easily inserted into the insertion hole, and to be hard to be released from the insertion hole. Thereby, the second mounted portion is easily prevented from being rotated, and easy to be mounted on the second mounting portion. Resultingly, the temporarily fixed electrical junction box is easily prevented from being rotated, and mounting workability of the electrical junction box is improved.

According to a seventh aspect of the present invention, there is provided the electrical junction box as described in the sixth aspect, wherein the first mounted portion and the second mounted portion are opposite to each other via the electrical junction box main body.

According to the electrical junction box as described in the seventh aspect, the first and second mounted portions are so arranged that a rotational range becomes maximum when the second mounted portion is rotated about the first mounted portion. However, the temporary fixation boss easy to be inserted into the insertion hole, and hard to be released from the insertion hole is arranged adjacent to the second mounted portion, and the insertion hole is arranged adjacent to the second mounting portion. Thereby, the second mounted portion is more easily prevented from being rotated, and easier to be mounted on the second mounting portion. Resultingly, the temporarily fixed electrical junction box is more easily prevented from being rotated, and mounting workability of the electrical junction box is further improved.

According to an eighth aspect of the present invention, there is provided the electrical junction box as described in the sixth or seventh aspect, wherein at least one claw portion is projected from each of both outsides along a direction from the first mounted portion toward the second mounted portion among radial directions of the shaft portion.

According to the electrical junction box as described in the eighth aspect, at least two claw portions are shifted 180 degrees from each other in a circumferential direction of the shaft portion. Further, both two claw portions are arranged on a radial direction of the rotation of the second mounted portion about the first mounted portion. Thereby, even when the second mounted portion is rotated about the first mounted portion, the inner edge of the insertion hole is more easily hooked on the boss, and the boss is harder to be released from the insertion hole. Therefore, the second mounted portion is more easily prevented from being rotated, and easier to be mounted on the second mounting portion. Resultingly, the temporarily fixed electrical junction box is more easily prevented from being rotated, and mounting workability of the electrical junction box is further improved.

According to a ninth aspect of the present invention, there is provided the electrical junction box as described in the eighth aspect, wherein the claw portion away from the first mounted portion is arranged at a tip side of the boss, and the claw portion near the first mounted portion is arranged at a base side of the boss, and wherein any one of the tip side claw portion and the base side claw portion abuts on the inner edge of the insertion hole from the base side in response to a positional gap between the shaft center of the boss and the center of the insertion hole.

According to the electrical junction box as described in the ninth aspect, at least two claw portions are shifted 180 degrees from each other in a circumferential direction of the shaft portion, and arranged on a radial direction of the rotation of the second mounted portion about the first mounted portion. Further, the claw portion disposed outside of the radial direction is shifted to the tip side, and the claw portion disposed inside of the radial direction is shifted to the base side in the shaft direction of the shaft portion substantially the same as the insertion direction of the boss. Further, any one of the tip side claw portion and the base side claw portion abuts on the inner edge of the insertion hole from the base side in response to a positional gap between the shaft center of the boss and the center of the insertion hole. Thereby, even when the second mounted portion is rotated about the first mounted portion, the inner edge of the insertion hole is more easily hooked on the boss, and the boss is harder to be released from the insertion hole. Therefore, the second mounted portion is more easily prevented from being rotated, and easier to be mounted on the second mounting portion. Resultingly, the temporarily fixed electrical junction box is more easily prevented from being rotated, and mounting workability of the electrical junction box is further improved.

Advantageous Effects of Invention

According to the invention described in the first aspect, the boss can be easily inserted into the insertion hole, and hard to be released from the insertion hole. Therefore, there is provided a temporary fixation boss able to improve workability.

According to the invention described in the second aspect, the boss can be easily inserted into the insertion hole, and hard to be released from the insertion hole. Therefore, there is provided a temporary fixation boss able to improve workability further.

According to the invention described in the third aspect, the boss can be easily inserted into the insertion hole, and hard to be released from the insertion hole. Therefore, there is provided a temporary fixation boss able to improve workability further.

According to the invention described in the fourth aspect, the boss can be easily inserted into the insertion hole, and hard to be released from the insertion hole. Therefore, there is provided a temporary fixation boss able to improve workability further.

According to the invention described in the fifth aspect, the boss can be easily inserted into the insertion hole, and hard to be released from the insertion hole. Therefore, there is provided a temporary fixation boss able to improve workability further.

According to the invention described in the sixth aspect, the temporarily fixed electrical junction box is easily prevented from being rotated, and mounting workability of the electrical junction box is improved. Therefore, there is provided an electrical junction box able to improve workability.

According to the invention described in the seventh aspect, the temporarily fixed electrical junction box is more easily prevented from being rotated, and mounting workability of the electrical junction box is further improved. Therefore, there is provided an electrical junction box able to improve workability further.

According to the invention described in the eighth aspect, the temporarily fixed electrical junction box is more easily prevented from being rotated, and mounting workability of the electrical junction box is further improved. Therefore, there is provided an electrical junction box able to improve workability further.

According to the invention described in the ninth aspect, the temporarily fixed electrical junction box is more easily prevented from being rotated, and mounting workability of the electrical junction box is further improved. Therefore, there is provided an electrical junction box able to improve workability further.

DESCRIPTION OF EMBODIMENTS

Hereinafter, a temporary fixation boss and an electrical junction box according to an embodiment of the present invention will be explained with reference to FIGS. 1 to 7. First, a configuration and a structure of the temporary fixation boss according to the embodiment of the present invention will be explained with mainly reference to FIG. 1.

(Configuration and Structure of Temporary Fixation Boss)

Figure 1:
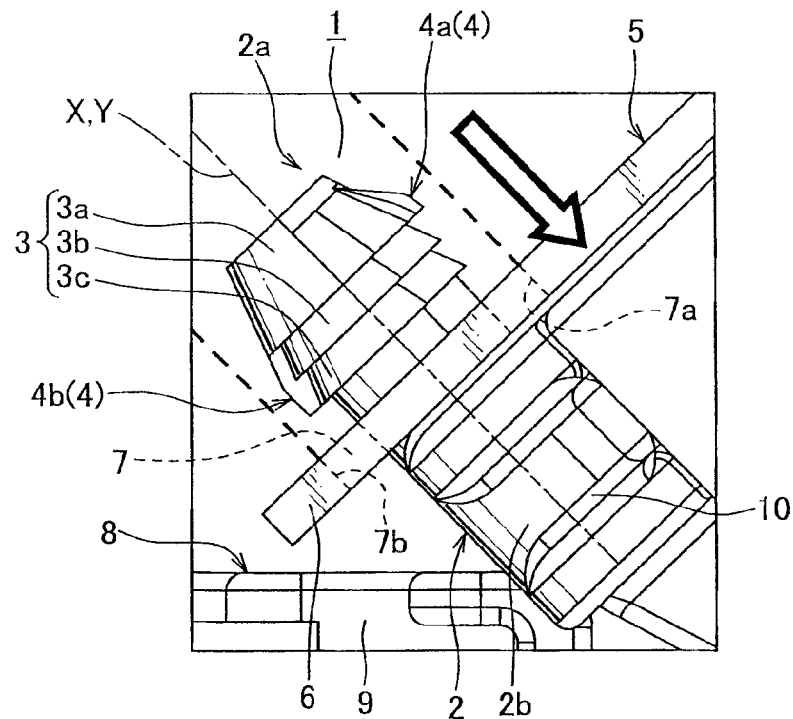
FIG. 1 is a side view showing a condition that a temporary fixation boss according to an embodiment of the present invention is inserted into an insertion hole of a metallic plate bracket.

As shown in FIG. 1, a temporary fixation boss 1 according to this embodiment includes: a shaft portion 2; a flared portion 3; and a claw portion 4. The shaft portion 2 has a diameter smaller than a diameter of an insertion hole 7 for temporary fixation provided on a temporary fixation portion 6 of a metallic bracket 5 as a mounting side. Further, in this embodiment, the shaft portion 2 is formed in a circular cylinder shape. Further, the shaft portion 2 has a length enough to project from the insertion hole 7 after the boss 1 is inserted into the insertion hole 7.

Figure 2:
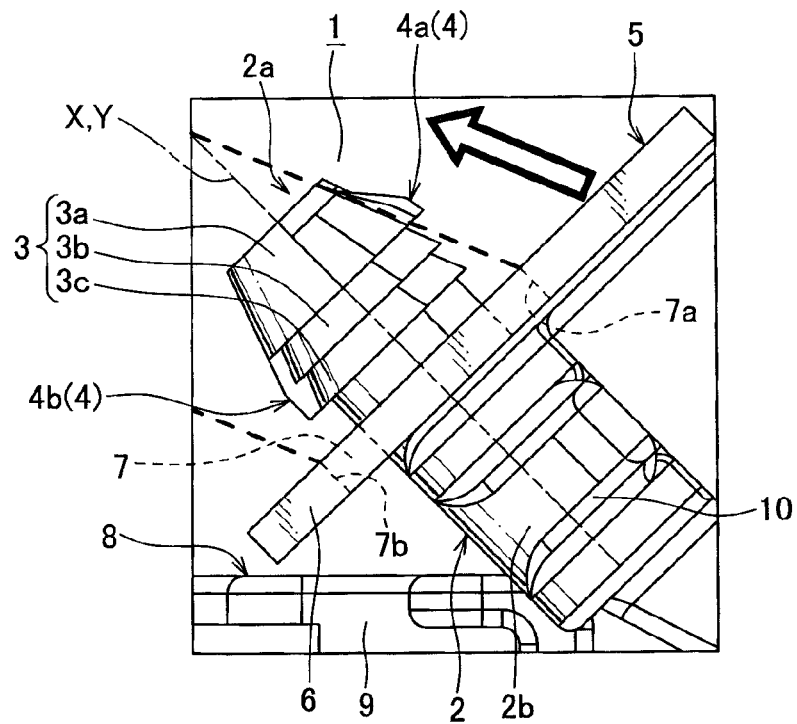
FIG. 2 is a side view showing the metallic plate bracket uplifted while a shaft center of the temporary fixation boss shown in FIG. 1 is aligned with the center of the insertion hole.
Figure 3:
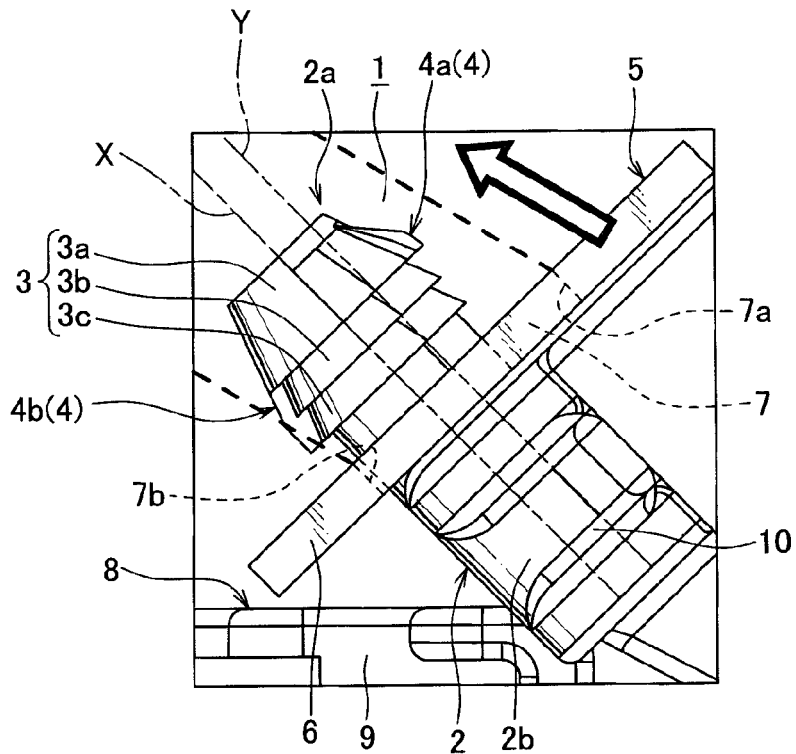
FIG. 3 is a side view showing the metallic plate bracket uplifted while the center of the insertion hole is misaligned upward with respect to the shaft center of the temporary fixation boss shown in FIG. 1.
Figure 4:
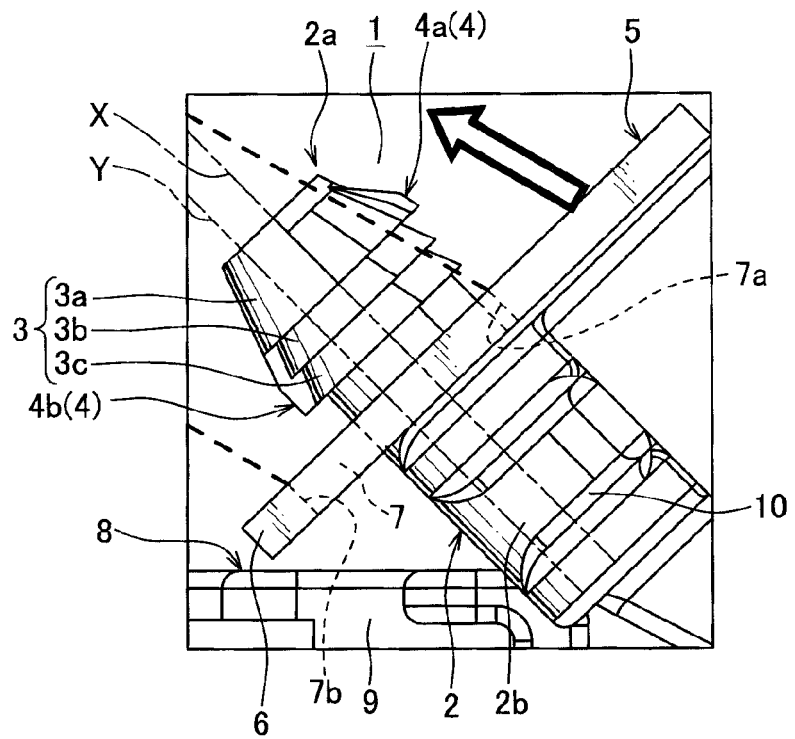
FIG. 4 is a side view showing the metallic plate bracket uplifted while the center of the insertion hole is misaligned downward with respect to the shaft center of the temporary fixation boss shown in FIG. 1.

Incidentally, FIG. 1 and later-referring FIGS. 2 to 4 are side views showing a later-described electrical junction box 8 viewing from a direction along a radial direction of a rotation of a second mounted portion 12 about a first mounted portion 11. Further, broken lines shown in FIGS. 1 to 4 indicate movement tracks of both ends 7a, 7b of an inner edge of the insertion hole 7 in a radial direction when the metallic plate bracket 5 is mounted on the electrical junction box 8. Further, one-dot chain lines shown in FIGS. 1 to 4 denote a shaft center X of the shaft portion 2. Further, two-dot chain lines shown in FIGS. 3 and 4 denote movement tracks of the center of the insertion hole 7 or the center axis Y of the insertion hole 7. However, FIGS. 1 and 2 show a case that the shaft center X of the shaft portion 2 is substantially matched with the center axis Y of the insertion hole 7. Therefore, in FIGS. 1 and 2, the center axis Y of the insertion hole 7 is expressed together with the shaft center X by the one-dot chain line denoting the shaft center X of the shaft portion 2. Further, in FIG. 1, the broken line denotes both the movement track of both ends 7a, 7b of the inner edge in the radial direction of the insertion hole 7 and a size in the radial direction of the insertion hole 7.

The flared portion 3 is provided at a tip 2a as one end of the shaft portion 2 in a manner to be flared in single step or multi steps from an outer periphery of the shaft portion 2 throughout the whole circumference of the shaft portion 2. In this embodiment, the flared portion 3 is continuously flared in three stages along a shaft direction of the boss, and formed in a so-called corrugated shape. As shown in FIG. 1, the flared portion 3 has a diameter larger than a diameter of the shaft portion 2, and smaller than a diameter of the insertion hole 7. Further, the diameter of the flared portion 3 is larger as extending from a tip 2a of the shaft portion 2 toward a base 2b as the other end of the shaft portion 2. Therefore, as shown in FIG. 1 and later-referring FIG. 7, the flared portion 3 of this embodiment is formed in a shape that circular truncated cones flared from the tip 2a toward the base 2b of the shaft portion 2 are laminated in three stages. Further, as shown in FIG. 1, after the boss 1 is inserted into the insertion hole 7, a flared portion 3c at the tip 2b side is projected from the insertion hole 7.

The claw portion 4 is partially projected from an outer periphery of the flared portion 3. As shown in FIG. 1, the claw portion 4 having a projection shape is so formed that a distance from the shaft center X of the shaft portion 2 to a tip end of the claw portion 4 in a radial direction of the shaft portion 2 is larger than a distance from the shaft center X to a tip end of the flared portion 3. Further, the claw portion 4 is so formed that the distance from the shaft center X of the shaft portion 2 to the tip end of the claw portion 4 in the radial direction of the shaft portion 2 is smaller than a distance from the shaft center X to the inner edge 7a, 7b of the insertion hole 7 when the shaft center X is aligned with the center axis Y of the insertion hole 7.

Further, at least one claw portion 4 is provided on both outer sides in the radial direction of the shaft portion 2 as the shaft center X is the center of symmetry. Further, at least two claw portions are shifted from each other along a shaft direction of the shaft portion 2. Further, a projection length of the claw portion 4 from the shaft center X becomes larger as extending toward the base 2b from the tip 2a of the shaft portion 2.

As shown in FIG. 1, in this embodiment, two claw portions 4a, 4b are arranged opposite to each other as the shaft center X of the shaft portion 2 is the center of symmetry along the radial direction of the rotation of the second mounted portion 12. Therefore, two claw portions 4a, 4b are shifted 180 degrees from each other in a circumferential direction of the shaft portion 2. Further, the outer claw portion 4a in the radial direction of the rotation of the second mounted portion 12 is disposed at the tip 2a side of the shaft portion 2. Further, the inner claw portion 4b in the radial direction of the rotation of the second mounted portion 12 is disposed at the base 2b side of the shaft portion 2.

Specifically, the outer claw portion 4a is projected on an outer periphery of the tip side flared portion 3a among the three stage flared portion 3a, 3b, 3c. In contrast, the inner claw portion 4b is projected on outer peripheries of the flared portions 3b, 3c from the middle flared portion 3b to the base side flared portion 3c. Further, each of the claw portions 4a, 4b is expanded to a specific width along a forward direction or a backward direction in a circumferential direction of the shaft portion 2 of the boss 1 about the radial direction of the rotation of the second mounted portion 12. This specific width may be a size allowing the claw portions to abut on anywhere of the inner edge of the insertion hole 7 to absorb a gap even when the second mounted portion 12 is shifted in a horizontal direction perpendicular to the radial direction of the rotation of the second mounted portion 12 while rotating. Owing to this structure, any one of the claw portions 4a, 4b is able to abut on the inner edges 7a, 7b of the insertion hole 7 in response to a positional gap between the shaft center X of the boss 1 and the center Y of the insertion hole 7. At this time, the claw portions 4a, 4b abut on the inner edges 7a, 7b of the insertion hole 7 from the base 2b side thereof.

More specifically, the tip side outer claw portion 4a abuts on the inner edge 7a disposed outside in the radial direction of the rotation of the second mounted portion 12 from the base 2b side. Further, the inner claw portion 4b abuts on the inner edge 7b disposed inside in the radial direction of the rotation of the second mounted portion 12 from the base 2b side. Hereinafter, the tip side outer claw portion 4a is referred to as the outer claw portion 4a, and the base side inner claw portion 4b is referred to as the inner claw portion 4b. Further, the inner edge 7a is referred to as the outside inner edge 7a, and the inner edge 7b is referred to as the inside inner edge 7b.

As shown in FIG. 1, the temporary fixation boss 1 having the above configuration and structure is attached to a temporary fixed portion 10 provided on a box main body 9 of the electrical junction box 8 from the base 2b side. The temporary fixed portion 10 is arranged on a position adjacent to the second mounted portion 12. Here, the position adjacent to the second mounted portion 12 means that after once the boss 1 is inserted into the insertion hole 7, even when the second mounted portion 12 starts being rotated, the position prevents the second mounted portion 12 to be rotated further without releasing the boss 1 from the insertion hole 7. Alternatively, the position adjacent to the second mounted portion 12 means that as long as the boss 1 is inserted into the insertion hole 7, the position prevents the second mounted portion 12 from being shifted or uplifted to arrange and hold the second mounted portion 12 opposite to a second mounting portion 14. Resultingly, the position adjacent to the second mounted portion 12 means that after the electrical junction box 8 is temporarily fixed to the metallic plate bracket 5 via the boss 1, the position allows the second mounted portion to be mounted on the second mounting portion 14 smoothly.

Further, the rotation of the second mounted portion 12 specifically means that the second mounted portion 12 is rotated in a direction separating from the second mounting portion 14 of a later-described attaching side 5 about the first mounted portion 11 mounted on a first mounting portion 13 of the attaching side 5. In this case, a direction from the first mounted portion 11 toward the second mounted portion 12 is the radial direction of the rotation of the second mounted portion 12. Further, this rotation of the second mounted portion 12 includes a horizontal shift, a vibration, or the like in every direction at 360 degrees around the radial direction and perpendicular to the radial direction. For preventing such a rotation, preferably, the temporary fixed portion 10 is provided on the second mounted portion 12 in view of, for example, the following factor.

Preferably, the temporary fixed portion 10 is provided adjacent to the second mounted portion 12 in view of a difference between a distance from the first mounted portion 11 to the temporary fixed portion 10 and a distance from the first mounted portion 11 to the second mounted portion 12. Alternatively, the temporary fixed portion 10 is provided adjacent to the second mounted portion 12 in view of an angular difference between a direction from the first mounted portion 11 to the temporary fixed portion 10 and a direction from the first mounted portion 11 to the second mounted portion 12. Incidentally, these conditions are properly set in proper values for preventing the rotation corresponding to a size, a weight, and a shape of the real product or to a predetermined accuracy of the mounting operation. Namely, they may be properly set in proper values within a range of tolerance.

Further, the shaft center X of the shaft portion 2 is also a shaft center of the boss 1. Further, the tip 2a and the base 2b of the shaft portion 2 respectively are the tip 2a and the base 2b of the boss 1. Further, according to this embodiment, the insertion hole 7 is formed in an oval shape or a coin shape extended along the radial direction of the second mounted portion 12 about the first mounted portion 11. Therefore, in FIGS. 1 to 4, a linear distance from the outside inner edge 7*a* to the inside inner edge 7*b* of the insertion hole 7 denotes a diameter size in a long axis direction of the insertion hole 7.

Next, an operation of the temporary fixation boss 1 will be explained with reference to FIGS. 1 to 4.

(Operation of Temporary Fixation Boss)

First, as shown in FIG. 1, a case that the metallic plate bracket 5 is mounted on the electrical junction box 8 will be explained. In this case, the metallic plate bracket 5 is moved close to the electrical junction box 8 in a direction shown by a while arrow in FIG. 1 to insert the boss 1 into the insertion hole 7. At this time, the shaft center X of the boss 1 should be substantially aligned with the center Y of the insertion hole 7. In the boss having the above structure, a diameter size of the shaft portion 2, a diameter size of the flared portion 3, and a distance from an outer side surface of the outer claw portion 4*a* to an outer side surface of the inner claw portion 4*b* along the radial direction of the shaft portion 2 are smaller than a diameter size of the insertion hole 7 along the radial direction of the rotation of the second mounted portion 12. In particular, in the radial direction of the boss 1, a length from the shaft center X to the outer side surface of the claw portions 4*a*, 4*b* as outmost projections is set shorted than a distance from the center axis Y to each inner edge 7*a*, 7*b* of the insertion hole 7. Further, a projection length of each claw portion 4*a*, 4*b* from the shaft center X becomes larger as extending from the tip 2*a* side toward the base 2*b* side of the shaft portion 2. Furthermore, a diameter of each flared portion 3*a*, 3*b*, and 3*c* also becomes larger as extending from the tip 2*a* side toward the base 2*b* side of the shaft portion 2.

According to such a structure, when the boss 1 is inserted into the insertion hole 7, each claw portion 4*a*, 4*b* is hard to abut on each inner edge 7*a*, 7*b* of the insert hole 7. Namely, a resistance is hard to be generated when the boss 1 is inserted into the insertion hole 7, and there is little fear to increase an insertion force. Therefore, the boss 1 can be easily inserted into the insertion hole 7.

As shown in FIG. 1, the metallic plate bracket 5 is moved close to the electrical junction box 8 until the base side flared portion 3*c* is projected from the insertion hole 7. Continuously, the first mounted portion 11 of the electrical junction box 8 is fixed to the metallic plate bracket 5 with a screw or the like. Thereby, the temporary fixation of the electrical junction box 8 to the metallic plate bracket 5 is finished.

Next, a condition that the temporary fixation of the electrical junction box 8 to the metallic plate bracket 5 is finished will be explained with reference to FIGS. 2 to 4. First, as shown in FIG. 2, a condition that the shaft center X of the boss 1 is substantially aligned with the center axis Y of the insertion hole 7 will be explained. This condition is referred to as a nominal position of the metallic plate bracket 5 with respect to the electrical junction box 8. In this condition, when the metallic plate bracket 5 is bent due to a weight of the electrical junction box 8, the second mounted portion 12 is rotated about the first mounted portion 11. Then, the metallic plate bracket 5 is relatively removed from the electrical junction box 8. Here, a while arrow in FIG. 2 indicates a direction of the metallic plate bracket 5 relatively removed from the electrical junction box 8 when the second mounted portion 12 is rotated about the first mounted portion 11. In this case, the inner edges 7*a*, 7*b* of the insertion hole 7 are moved along tracks shown by broken lines in FIG. 2. Then, though the inside inner edge 7*b* of the insertion hole 7 does not abut on the boss 1, the outside inner edge 7*a* abuts on the outer claw portion 4*a* of the boss 1 from the base 2*b* side.

Next, a condition that the shaft center X of the boss 1 is shifted downward with respect to the center axis Y of the insertion hole 7 will be explained with reference to FIG. 3. Here, the term downward indicates an inside in the radial direction of the rotation of the second mounted portion 12 about the first mounted portion 11. This condition is also a condition that the metallic plate bracket 5 is shifted relatively upward with respect to the electrical junction box 8. In such a condition, when the second mounted portion 12 is rotated about the first mounted portion 11, the metallic plate bracket 5 is relatively moved away from the electrical junction box 8 along a direction shown by a white arrow in FIG. 3. In such a case, inner edges 7*a*, 7*b* of the insertion hole 7 are moved along tracks shown by broken lines in FIG. 3. Then, contrary to the case that the metallic plate bracket 5 is in the nominal position, though the outside inner edge 7*a* of the insertion hole 7 does not abut on the boss 1, the inside inner edge 7*b* of the insertion hole 7 abuts on the inner claw portion 4*b* of the boss 1 from the base 2*b* side.

Next, a condition that the shaft center X of the boss 1 is shifted upward with respect to the center axis Y of the insertion hole 7 will be explained with reference to FIG. 4. Here, the term upward indicates an outside in the radial direction of the rotation of the second mounted portion 12 about the first mounted portion 11. This condition is also a condition that the metallic plate bracket 5 is shifted relatively downward with respect to the electrical junction box 8. In such a condition, when the second mounted portion 12 is rotated about the first mounted portion 11, the metallic plate bracket 5 is relatively moved away from the electrical junction box 8 along a direction shown by a white arrow in FIG. 4. In such a case, inner edges 7*a*, 7*b* of the insertion hole 7 are moved along tracks shown by broken lines in FIG. 4. Then, similar to the case that the metallic plate bracket 5 is in the nominal position, though the inside inner edge 7*b* of the insertion hole 7 does not abut on the boss 1, the outside inner edge 7*a* of the insertion hole 7 abuts on the base side flared portion 3*c* of the boss 1 from the base 2*b* side.

The boss 1 having the above structure is provided with the flared portion 3 flared in three stages throughout a whole circumference on an outer periphery at the tip 2*a* of the shaft portion 2. Therewith, two claw portions 4*a*, 4*b* are projected from the outer peripheries of the flared portions 3*a*, 3*b*, and 3*c*. Namely, the boss 1 is provided with the flared portion 3 (3*a*, 3*b*, and 3*c*) and the claw portion 4 (4*a*, 4*b*) projected in a direction narrowing the gap between the boss 1 and the insertion hole 7. Thereby, after once the boss 1 is inserted into the insertion hole 7, the inner edges 7*a*, 7*b* of the insertion hole 7 are easily hooked on the boss 1, and the boss 1 is hard to be released from the insertion hole 7.

In particular, in the boss 1 of this embodiment, the outer claw portion 4*a* and the inner claw portion 4*b* are shifted 180 degrees from each other in a circumferential direction of the shaft portion 2. Therewith, the outer claw portion 4*a* and the inner claw portion 4*b* are shifted in the shaft direction of the shaft portion 2 substantially the same as the insertion direction of the boss 1 into the insertion hole 7. Further, the projecting lengths of the outer claw portion 4*a* and the inner claw portion 4*b* are larger as extending from the tip 2 side toward the base 2*b* side of the shaft portion 2. Further, diameters of the flared portions 3*a*, 3*b*, and 3*c* are also larger as extending from the tip 2 side toward the base 2*b* side of the shaft portion 2.

According to such a structure, after once the boss 1 is inserted into the insertion hole 7, even when the metallic plate bracket 5 is shifted upward or downward with respect to the electrical junction box 8, or inclined, the inner edges 7*a*, 7*b* of the insertion hole 7 are easily hooked on the boss 1. Namely, even when the metallic plate bracket 5 is uplifted from the electrical junction box 8, the holding force of the metallic plate bracket 5 is improved by locking shapes of the outer claw portion 4a and the inner claw portion 4b. Thereby, the boss 1 is hard to be released from the insertion hole 7.

In particular, because the outer claw portion 4a and the inner claw portion 4b are arranged at an upper side and a lower side respectively in the rotational direction of the electrical junction box 8, even when the metallic plate bracket 5 is shifted in various directions including upward and downward, any one of the outer claw portion 4a and the inner claw portion 4b is positioned on a moving track of any one of inner edges of the insertion hole 7. Owing to such hooking structures of the claw portions 4a, 4b, the holding force of the metallic plate bracket 5 is further improved. Further, as described above, in the flared portion 3 having three stages in a corrugate shape, owing to each flared portion 3a, 3b, and 3c, the holding force of the metallic plate bracket 5 is further improved. Thereby, according to this embodiment, there is little fear that the temporary fixation portion 6 of the metallic plate bracket 5 may be released from the temporary fixed portion 10 of the electrical junction box 8.

Next, a configuration and a structure of each of the electrical junction box 8 and the metallic plate bracket 5 on which the electrical junction box 8 is mounted according to this embodiment will be explained with reference mainly to FIGS. 5 and 6.

(Configurations and Structures of the Electrical Junction Box and the Metallic Plate Bracket)

Figure 5:
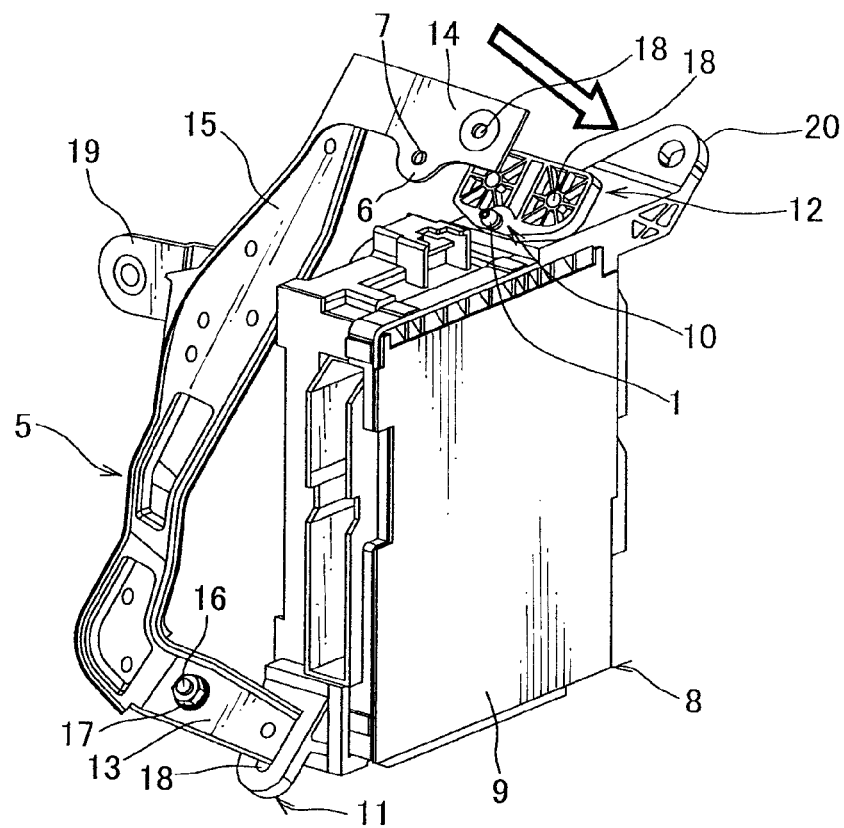
FIG. 5 is a perspective view showing an electrical junction box according to an embodiment of the present invention before temporarily fixed to the metallic plate bracket.
Figure 6:
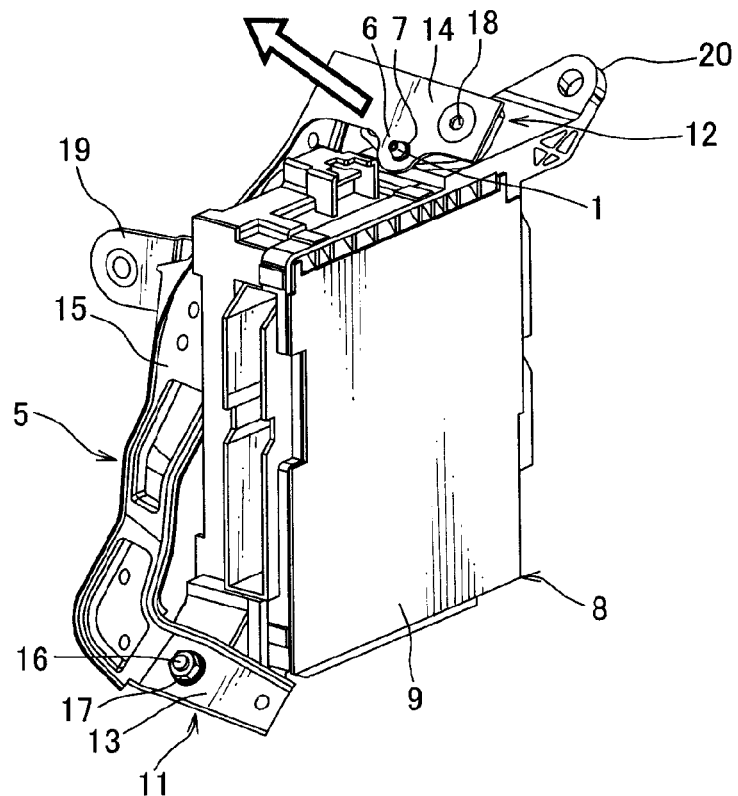
FIG. 6 is a perspective view showing the electrical junction box according to the embodiment of the present invention temporarily fixed to the metallic plate bracket.

As shown in FIGS. 1 to 6, the electrical junction box 8 is provided with the first mounted portion 11 and the second mounted portion 12. As shown in FIGS. 5 and 6, the first mounted portion 11 is mounted on the first mounting portion 13 of the metallic plate bracket 5. Further, the second mounted portion 12 is mounted on the second mounting portion 14 of the metallic plate bracket 5. In this embodiment, the first mounted portion 11 and the second mounted portion 12 are opposite to each other via the box main body 9 of the electrical junction box 8. Specifically, both of the first mounted portion 11 and the second mounted portion 12 are arranged on a diagonal line of the electrical junction box main body 9.

The above temporary fixed portion 10 on which the temporary fixation boss 1 is mounted is arranged adjacent to the second mounted portion 12. As shown in FIGS. 1 to 4, the boss 1 is mounted on the temporary fixed portion 10 while the claw portions 4a, 4b are arranged on both outsides along a direction from the first mounted portion 11 to the second mounted portion 12 in the radial direction of the shaft portion 2. The outer claw portion 4a disposed a far side from the first mounted portion 11 is arranged at the tip 2a side of the boss 1. Further, the inner claw portion 4b disposed at a near side of the first mounted portion 11 is arranged at the base 2b side of the boss 11.

Further, the metallic plate bracket 5 as the mounting side on which the electrical junction box 8 is mounted is formed in a shape connecting the first mounting portion 13 and the second mounting portion 14 with both ends of a long bracket main body 15. The first mounting portion 13 of the metallic plate bracket 5 is arranged at a position corresponding to the first mounted portion 11 of the electrical junction box 8. Therewith, the second mounting portion 14 of the metallic plate bracket 5 is arranged at a position corresponding to the second mounted portion 12 of the electrical junction box 8. Further, the temporary fixation portion 6 of the metallic plate bracket 5 is arranged adjacent to the second mounting portion 14 of the metallic plate bracket 5 corresponding to the temporary fixed portion 10 of the electrical junction box 8. Mounting holes 18 for mounting the electrical junction box 8 on the metallic plate bracket 5 using the bolts 16 and the nuts 17 are provided respectively on the first mounted portion 11, the second mounted portion 12, the first mounting portion 13, and the second mounting portion 14. Further, the temporary fixation insertion hole 7 for inserting the above temporary fixation boss 1 is provided on the temporary fixation portion 6.

Figure 7:
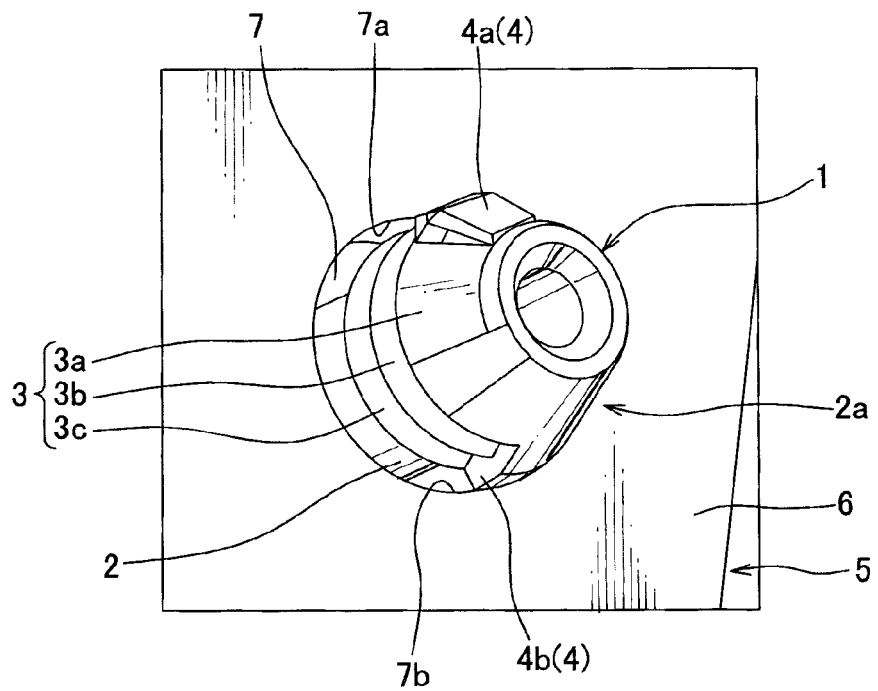
FIG. 7 is a perspective view showing the temporary fixation boss in a condition shown in FIG. 6.

Next, a mounting operation of the electrical junction box 8 on the metallic plate bracket 5 according to this embodiment will be explained with reference mainly to FIGS. 5 to 7.

(Mounting Operation of Electrical Junction Box)

First, as shown in FIG. 5, the first mounting portion 13 and the second mounting portion 14 of the metallic plate bracket 5 are arranged facing the first mounted portion 11 and the second mounted portion 12 of the electrical junction box 8. Continuously, along a direction shown by a white arrow in FIG. 5, the metallic plate bracket 5 is moved close to the electrical junction box 8, and the boss 1 is inserted into the insertion hole 7. At this time, as shown in FIG. 7, the base side flared portion 3c disposed at the base 2b side is projected from the insertion hole 7.

In a condition that the insertion operation of the boss 1 is finished, the center of the mounting hole 18 provided on the first mounting portion 13 of the metallic plate bracket 5 is substantially aligned with the center of the mounting hole 18 provided on the first mounted portion 11 of the electrical junction box 8. Similarly, the center of the mounting hole provided on the second mounting portion 14 of the metallic plate bracket 5 is substantially aligned with the center of the mounting hole 18 provided on the second mounted portion 12 of the electrical junction box 8.

Next, as shown in FIG. 6, the first mounting portion 13 of the metallic plate bracket 5 and the first mounted portion 11 of the electrical junction box 8 are screwed together with the bolt 16 and the nut 17. Thereby, a temporary fixation operation of the electrical junction box 8 to the metallic plate bracket 5 is finished.

Next, though a specific and detailed explanation using figures is omitted, the electrical junction box 8 and the metallic plate bracket 5 are carried to a factory floor where mounting on a vehicle while they are in a temporary fixation condition. In this case, until the second mounted portion 12 is mounted on the second mounting portion 14, the second mounted portion 12 is practically in a free condition. Then, as described above, when the metallic plate bracket 5 is bent or the like, the metallic plate bracket 5 is about to be uplifted from the electrical junction box 8 along a direction shown by a while arrow in FIG. 6. Namely, the second mounted portion 12 is about to be rotated about the first mounted portion 11 mounted on the first mounting portion 13. However, because the electrical junction box 8 is temporarily fixed to the metallic plate bracket 5 with the above temporary fixation boss 1, there is little fear that the electrical junction box 8 may be released from the metallic plate bracket 5. Namely, the second mounted portion 12 is prevented from being rotated. Resultingly, the electrical junction box 8 is prevented from being rotated about the first mounted portion 11.

Continuously, the electrical junction box 8 is fixed to a vehicle main body together with the metallic plate bracket 5. For example, first, a stud bolt projected from the vehicle main body is inserted into the mounting hole 18 provided on the second mounting portion 14 of the metallic plate bracket 5 and into the mounting hole 18 provided on the second mounted portion 12 of the electrical junction box 8. In this case, because the electrical junction box 8 and the metallic plate bracket 5 are temporarily fixed to each other with the temporary fixation boss 1, the stud bolt is easily and smoothly inserted into each mounting hole 18. Therefore, the temporary fixation boss 1 is also referred to as a positioning boss.

Continuously, the bolt is screwed with a nut from an opposite side via the second mounted portion 12 and the second mounting portion 14. Thereby, a fixation operation of the electrical junction box 8 to the metallic plate bracket 5 is finished. Therewith, an assembling operation of the electrical junction box 8 with the metallic plate bracket 5 is finished. Further, a vehicle mounting portion 19 provided in the middle of the metallic plate bracket 5 is fixed to the vehicle main body using a vehicle side stud bolt and a vehicle side nut. Thereby, a mounting operation of the electrical junction box 8 on a vehicle is finished. Incidentally, though the electrical junction box 8 is provided with a third mounted portion 20, when the electrical junction box 8 is fixed to the vehicle main body via the metallic plate bracket 5, it is unnecessary to use the third mounted portion 20.

According to the electrical junction box 8 having the above structure, by using the temporary fixation boss 1, it becomes extremely easy to prevent the rotation of the temporarily fixed electrical junction box 8. Thereby, for example, it becomes extremely easy to do a mounting operation of the electrical junction box 8 on a factory floor where the electrical junction box 8 is mounted on a vehicle main body in a production line of an automaker.

As explained above, according to the boss 1 of this embodiment, it becomes easy to do a temporary fixation operation of the electrical junction box 8. Resultingly, it becomes easy to do a mounting operation of the electrical junction box 8, and mounting workability is largely improved.

Incidentally, the temporary fixation boss 1 and the electrical junction box 8 according to the present invention are not limited to the embodiment explained above. The structure, the shape, or the setting can be changed variously, or combined within a scope of the present invention.

For example, according to the above embodiment, the electrical junction box 8 is indirectly mounted on a vehicle main body via the metallic plate bracket 5, however, the present invention is not limited to this. If it is possible for the electrical junction box 8 to be directly mounted on a vehicle main body, the metallic plate bracket 5 is unnecessary. In this case, the attaching side 5 is the vehicle main body. Naturally, the temporary fixation portion 6, the first mounting portion 13, and the second mounting portion 14 are provided on the vehicle main body.

Further, according to the above embodiment, the insertion hole 7 is formed in an oval shape or a coin shape extended along the radial direction of the second mounted portion 12 about the first mounted portion 11. However, the present invention is not limited to this. For example, the insertion hole 7 may be formed in an oval shape or a coin shape along a direction extending from the first mounted portion 11 toward the temporary fixed portion 10. Alternatively, the insertion hole 7 may be formed in an exact circle shape. In this case, the longer diameter of the insertion hole 7 is the diameter of the insertion hole 7.

Further, according to the above embodiment, the claw portions 4a, 4b of the boss 1 are projected along the radial direction of the rotation of the second mounted portion 12. However, the present invention is not limited to this. The claw portions 4a, 4b may be projected in any direction from a circumferential direction of the boss 1. For example, the claw portions 4a, 4b may be projected along a direction from the first mounted portion 11 toward the temporary fixed portion 10. In this case, widths of the claw portions 4a, 4b extended in the circumferential direction of the boss 1 may be set properly corresponding to an angle difference between a direction from the first mounted portion 11 toward the temporary fixed portion 10 and a direction from the first mounted portion 11 toward the second mounted portion 12.

Specifically, if the angle difference between a direction from the first mounted portion 11 toward the temporary fixed portion 10 and a direction from the first mounted portion 11 toward the second mounted portion 12 is about 45 degrees, using the direction the first mounted portion 11 toward the temporary fixed portion 10 as a base, the claw portions 4a, 4b may be expanded in a width of about 45 degrees from the first mounted portion 11 toward the second mounted portion 12 in the circumferential direction of the boss 1. The same effect as the above embodiment can be attained with such a setting.

Further, a positional relationship between the temporary fixation portion 6 at the attaching side 5 and the second mounting portion 14 may be properly set corresponding to a positional relationship between the temporary fixed portion 10 of the above electrical junction box 8 and the second mounted portion 12. Namely, the insertion hole 7 may be arranged adjacent to the second mounting portion 14 for allowing the boss 1 to be smoothly inserted into the insertion hole 7 and to prevent the second mounted portion from being rotated.

Further, the number of the claw portions 4 is not limited to the above two. More than two claw portions 4 may be provided on the boss 1. Further, the number of the claw portions provided on one stage of the flared portions 3 is not limited to above one. More than one claw portions 4 may be provided on the one stage of the flared portions 3. Further, the number of the flared portions 3 is not limited to the above three. The number of the flared portions 3 provided on the boss 1 may be less than three, or more than three. Further, the flared portions are not necessarily provided continuously throughout the stages. The flared portions 3 may be provided intermittently along a shaft direction of the boss 1. Further, a shape of the flared portion 3 is not limited to the above circular truncated cone shape. The flared portion 3 may be formed in a truncated pyramid shape such as triangular truncated pyramid shape, quadrangular truncated pyramid shape, or hexagonal truncated pyramid shape. Further, the shape of the shaft portion 2 of the boss 1 is also not limited to the above circular cylinder shape. The shaft portion 2 of the boss 1 may be formed in an oval cylinder shape, or an elongated cylinder shape similar to the shape of the insertion hole 7. Alternatively, the shaft portion 2 of the boss 1 may be formed in a polygonal column shape such as triangular column, quadrangular column, or hexagonal column.

Further, the various conditions and setting values explained above are not limited to the above content. They may be probably set within a range able to carry out the present invention smoothly.

INDUSTRIAL APPLICABILITY

According to the temporary fixation boss of the present invention, because a resistance upon inserting the boss into the insertion hole is hard to be generated, the boss can be easily inserted into the insertion hole. Further, after once the boss is inserted into the insertion hole, because an inner edge of the insertion hole is easily hooked on the boss, the boss is hard to be released from the insertion hole. In this way, because the boss can be easily inserted into the insertion hole, and hard to be released from the insertion hole, the workability is improved. Further, the electrical junction box of the present invention includes the temporary fixation boss of the present invention. Thereby, the temporarily fixed electrical junction box is easily prevented from being rotated, and mounting workability of the electrical junction box is improved. Therefore, the temporary fixation boss and the electrical junction box according to the present invention can be used for improving workability.

REFERENCE SIGNS LIST 1 temporary fixation boss
2 shaft portion
2a tip of the shaft portion (one end of the shaft portion)
2b base of the shaft portion (the other end of the shaft portion)
3 flared portion
3a tip side flared portion
3b middle flared portion
3c base side flared portion
4 claw portion
4a outer claw portion (tip of the claw portion)
4b inner claw portion (base of the claw portion)
5 metallic plate bracket (mounting side)
6 temporary fixation portion
7 insertion hole for temporary fixation
7a outside inner edge of the insertion hole
7b inside inner edge of the insertion hole
8 electrical junction box
9 electrical junction box main body
10 temporary fixed portion
11 first mounted portion
12 second mounted portion
13 first mounting portion
14 second mounting portion
15 bracket main body
16 bolt
17 nut
18 attachment hole
19 vehicle mounting portion
20 third mounted portion
X shaft center of the shaft portion (shaft center of the boss)
Y center axis of the insertion hole

The invention claimed is:

1. A temporary fixation system comprising a temporary fixation boss and an insertion hole formed in a circle shape, the temporary fixation boss comprising:
   a shaft portion having a diameter smaller than a diameter of the insertion hole;
   a flared portion flared singularly or collectively throughout a whole circumference on an outer periphery of the shaft portion and disposed at one end of the shaft portion, said flared portion having a diameter smaller than the diameter of the insertion hole; and
   a claw portion projected from an outer periphery of the flared portion, and a distance from a shaft center of the shaft portion to a tip of the claw portion in a radial direction of the shaft portion being longer than a distance from the shaft center to a tip of the flared portion and shorter than a distance from the shaft center to an inner edge of the insertion hole when the shaft center is aligned with the center of the insertion hole,
   wherein the claw portion is formed on the outer periphery of the flared portion so that a projection length of the claw portion from the shaft center becomes larger as extending toward the other end from the one end of the shaft portion, and has a width expanded along a circumferential direction of the shaft portion, and
   wherein the width of the claw portion has a size to be able to abut on an inner edge of the insertion hole in response to a positional gap between the shaft center and the center of the insertion hole.

2. The temporary fixation system as claimed in claim 1, wherein at least one claw portion is respectively provided on opposing outer sides in the radial direction of the shaft portion with the shaft center being a center of symmetry.

3. The temporary fixation system as claimed in claim 1, wherein at least two of the claw portions are shifted from each other along a shaft direction of the shaft portion.

4. The temporary fixation system as claimed in claim 1, wherein the diameter of the flared portion becomes larger as extended toward the other end from the one end of the shaft portion.

5. An electrical junction box comprising:
   a first mounted portion through which an electrical junction box main body is mounted on a first mounting portion of a mounting side;
   a second mounted portion configured to be mounted on a second mounting portion of the mounting side, and to be rotated about the first mounted portion mounted on the first mounting portion until mounted on the second mounting portion,
   wherein the temporary fixation boss as claimed in claim 1 is arranged adjacent to the second mounted portion, and
   wherein the boss is inserted into the insertion hole arranged adjacent to the second mounting portion of the mounting side from the one end of the shaft portion to prevent the second mounted portion from rotating.

6. The electrical junction box as claimed in claim 5, wherein the first mounted portion and the second mounted portion are opposite to each other via the electrical junction box main body.

7. The electrical junction box as claimed in claim 5, wherein at least one claw portion is projected from each of both outsides along a direction from the first mounted portion toward the second mounted portion among radial directions of the shaft portion.

8. The electrical junction box as claimed in claim 7, wherein the claw portion away from the first mounted portion is arranged at a tip side of the boss, and the claw portion near the first mounted portion is arranged at a base side of the boss, and
   wherein any one of the tip side claw portion and the base side claw portion abuts on the inner edge of the insertion hole from the base side in response to a positional gap between the shaft center of the boss and the center of the insertion hole.

* * * * *